United States Patent
Patwardhan et al.

(10) Patent No.: US 9,411,821 B1
(45) Date of Patent: *Aug. 9, 2016

(54) BLOCK-BASED BACKUPS FOR SUB-FILE MODIFICATIONS

(71) Applicant: EMC Corporation, Hopkinton, MA (US)

(72) Inventors: Kedar Shrikrishna Patwardhan, Pune (IN); Suraj Multani, Bangalore (IN); Manjunath Tadahal, Bangalore (IN)

(73) Assignee: EMC Corporation, Hopkinton, MA (US)

( * ) Notice: Subject to any disclaimer, the term of this patent is extended or adjusted under 35 U.S.C. 154(b) by 260 days.

This patent is subject to a terminal disclaimer.

(21) Appl. No.: 14/227,202

(22) Filed: Mar. 27, 2014

(51) Int. Cl.
*G06F 17/30* (2006.01)

(52) U.S. Cl.
CPC .... *G06F 17/30227* (2013.01); *G06F 17/30088* (2013.01)

(58) Field of Classification Search
USPC .................................................. 707/639, 825
IPC .................................................. G06F 17/30088
See application file for complete search history.

(56) References Cited

U.S. PATENT DOCUMENTS

| | | | | |
|---|---|---|---|---|
| 6,341,341 B1 * | 1/2002 | Grummon | ............. | G06F 3/0617 711/162 |
| 6,959,310 B2 * | 10/2005 | Eshel | ................ | G06F 17/30067 |
| 7,284,104 B1 * | 10/2007 | Wu | ...................... | G06F 11/1451 707/999.202 |
| 7,596,713 B2 * | 9/2009 | Mani-Meitav | ...... | G06F 11/1456 707/999.2 |
| 7,603,391 B1 * | 10/2009 | Federwisch | ......... | G06F 11/2066 |
| 7,769,721 B2 * | 8/2010 | Ueoka | ................. | G06F 11/1662 707/679 |
| 7,979,395 B1 * | 7/2011 | Aggarwal | ......... | G06F 17/30088 707/649 |
| 7,984,085 B1 * | 7/2011 | Aggarwal | ......... | G06F 17/30088 707/821 |
| 7,991,973 B2 * | 8/2011 | Jacobson | .............. | G06F 3/0611 707/639 |
| 8,005,797 B1 * | 8/2011 | Chepel | ................ | G06F 11/1451 707/649 |
| 8,055,613 B1 * | 11/2011 | Mu | ...................... | G06F 11/1451 707/610 |
| 8,074,035 B1 * | 12/2011 | Per | ...................... | G06F 11/1451 707/610 |
| 8,200,638 B1 * | 6/2012 | Zheng | ................. | G06F 11/1464 707/679 |
| 8,250,033 B1 * | 8/2012 | De Souter | ......... | G06F 17/30088 707/637 |
| 8,386,492 B2 * | 2/2013 | Anzai | ............... | G06F 17/30067 707/740 |
| 8,549,518 B1 * | 10/2013 | Aron | .................... | G06F 9/45558 718/1 |
| 8,601,473 B1 * | 12/2013 | Aron | .................... | G06F 9/45533 709/223 |

(Continued)

OTHER PUBLICATIONS

U.S. Appl. No. 14/227,202, Cam-Linh Nguyen.*

*Primary Examiner* — Cam-Linh Nguyen
(74) *Attorney, Agent, or Firm* — Dergosits & Noah LLP; Todd A. Noah

(57) ABSTRACT

Block-based backups for sub-file modifications are described. A system records an identifier of a modified file into a file modification journal. The system records an identifier corresponding to a modified block in a file system into a modified block map. The system creates a modified file block map based on the identifier of the modified file in the file modification journal. The system identifies a modified file block corresponding to the modified file based on an intersection of the modified block map and the modified file block map. The system reads the modified file block from the file system using a file system read interface. The system writes the modified file block to a backup storage.

20 Claims, 4 Drawing Sheets

(56) References Cited

U.S. PATENT DOCUMENTS

| | | | | |
|---|---|---|---|---|
| 8,850,130 B1* | 9/2014 | Aron | ............... | G06F 9/52 711/150 |
| 8,863,124 B1* | 10/2014 | Aron | ............... | G06F 9/45533 709/223 |
| 8,990,164 B1* | 3/2015 | Mahajan | ............... | G06F 11/1451 707/649 |
| 9,171,002 B1 | 10/2015 | Mam | ............... | G06F 17/30091 |
| 2001/0044807 A1* | 11/2001 | Kleiman | ............... | G06F 17/30067 |
| 2002/0049718 A1* | 4/2002 | Kleiman | ............... | G06F 11/1435 |
| 2003/0101321 A1* | 5/2003 | Ohran | ............... | G06F 11/1451 711/162 |
| 2008/0040368 A1* | 2/2008 | Li | ............... | H04L 67/06 |
| 2009/0006496 A1* | 1/2009 | Shoens | ............... | G06F 17/3023 |
| 2010/0077160 A1* | 3/2010 | Liu | ............... | G06F 3/0482 711/162 |
| 2010/0179959 A1* | 7/2010 | Shoens | ............... | G06F 17/30088 707/758 |
| 2010/0306174 A1* | 12/2010 | Otani | ............... | G06F 11/1464 707/640 |
| 2011/0252208 A1* | 10/2011 | Ali | ............... | G06F 11/1451 711/162 |
| 2012/0151245 A1* | 6/2012 | Chang | ............... | G06F 17/30227 714/4.1 |

* cited by examiner

BLOCK-BASED BACKUPS FOR SUB-FILE MODIFICATIONS

BACKGROUND

If a software error corrupts a data object, or if erroneous data updates the data object, a data protection administrator may restore the data object to a previous uncorrupted state that does not include the corrupted or erroneous data. A backup application executes a backup operation either occasionally or continuously to enable this restoration, storing a copy of each desired data object state (such as the values of data and these values' embedding in a database's data structures) within dedicated backup files. When the data protection administrator decides to return the data object to a previous state, the data protection administrator specifies the desired previous state by identifying a desired point in time when the data object was in this state, and instructs the backup application to execute a restore operation to restore a copy of the corresponding backup files for that state to the data object.

A snapshot is a capture of a state of a data object, such as a file system or an application, at a specific moment in time. A file system may be stored on a storage array, which is a disk storage system that includes multiple disk drives. Unlike a disk enclosure, a storage array has cache memory and advanced functionality, such as virtualization and Redundant Array of Independent Disks (RAID). A data protection administrator may manage a backup application to create snapshots of data objects stored on multiple storage arrays.

In data transmission and data storage, a block is a sequence of bytes or bits having a fixed length, or block size. The process of putting data into blocks is used to facilitate the handling of a data-stream by a computer program receiving data. Blocked data is normally read a whole block at a time. Blocking is almost universally employed when storing data to 9-track magnetic tape, to rotating media such as floppy disks, hard disks, optical disks, and to NAND flash memory. Most file systems are based on a block device, which is a level of abstraction for the hardware responsible for storing and retrieving specified blocks of data, though the block size in file systems may be a multiple of the physical block size. In many file systems, a single block might contain only a part of a single file. Block storage is normally abstracted by a file system or database management system for use by applications and end users. An incremental block-based backup involves taking a snapshot of a file system, reading the blocks that have been modified since the last backup, and storing copies of the modified blocks into some block backed backup format, such as virtual hard disk (VHD).

DETAILED DESCRIPTION

Figure 1:
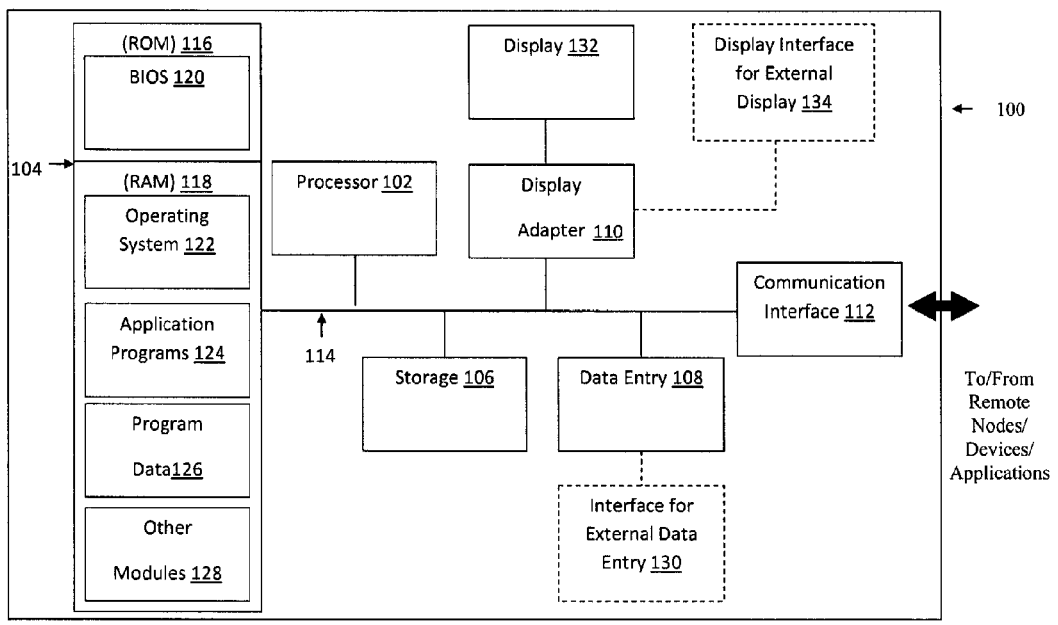
FIG. 1 is a block diagram illustrating an example hardware device in which the subject matter may be implemented.

Some backup applications have the capability to incrementally backup sub-file modifications either by trawling a source file system to identify modified files or by integrating with a file modification journal to track sub-file modifications to a file system. However, tracking sub-file modifications to files may become a significant problem if a file system consists of several large and possibly sparse files that are being randomly written to by an application. For example, oil and gas analytics applications, geo-satellite imagery analysis applications, motion picture video processing applications, big-data analytics applications, and mathematical/physics/micro biology analytics applications often work with several large and sparse files and issue sub-file (non-appending) modifications to these files as data is generated and stored as an intermediate or final result. If such a file system has 1,000 large sparse files of size 10 TB each, and if the file system is backed by a 64 TB volume, the total amount of data stored in all of files taken together cannot exceed 64 TB. However, the file modification journal needs to track sub-file modifications for each file that can originate anywhere within the size of the individual files. Therefore, the total logical range that needs to be tracked by the file modification journal is 10 TB for each file and 10,000 TB for all files taken together. For such a large logical range, irrespective of how the modifications to regions of files are recorded into the file modification journal, the amount of time required to log a new sub-file modification, remove duplicate sub-file modifications, and read all of the modified regions of the files during backup is a very costly operation. Furthermore, the on-disk footprint of the file modification journal is also very large.

Embodiments herein provide block-based backups for sub-file modifications. An identifier of a modified file is recorded into a file modification journal. An identifier corresponding to a modified block in a file system is recorded into a modified block map. A modified file block map is created based on the identifier of the modified file in the file modification journal. A modified file block corresponding to the modified file is identified based on an intersection of the modified block map and the modified file block map. The modified file block is read from the file system using a file system read interface, and written to a backup storage.

For example, a blocking enhancer records the file identifier A into a file modification journal because the File A includes a sub-file modification that occurred since the last backup. The file modification journal remains limited in size because the file modification journal does not track any of the many possible ranges where sub-file modifications occurred within the File A. The blocking enhancer also records the block identifier 1 that corresponds to a block modified since the last backup, and stores the block identifier 1 into a modified block map, such that the regions of sub-file modifications are tracked more efficiently using existing block boundaries. Then the blocking enhancer creates a modified file block map based on the modified File A, which includes the blocks 1 and 2. Next the blocking enhancer intersects its maps, which include the blocks 1 and 2 for the modified File A and include the block identifier 1, to identify the block identifier 1 for the modified File A. Having identified the modified block for the modified file, the blocking enhancer reads the modified block 1 for the modified File A using a file system read interface, and writes the modified block 1 for the modified File A to a backup storage, which creates an incremental backup of the sub-file modification for File A. The blocking enhancer tracks sub-file modifications to large files such that it is extremely easy, fast, and efficient to eliminate duplicate sub-file modifications, track and store the sub-file modifications and read them during backup. The file modification journal size used to track the sub-file modifications is proportional the size of the file system and not proportional to the logical space of all of the large files present in the file system.

Prior to describing the subject matter in detail, an exemplary hardware device in which the subject matter may be implemented shall first be described. Those of ordinary skill in the art will appreciate that the elements illustrated in FIG. 1 may vary depending on the system implementation. With reference to FIG. 1, an exemplary system for implementing the subject matter disclosed herein includes a hardware device 100, including a processing unit 102, memory 104, storage 106, data entry module 108, display adapter 110, communication interface 112, and a bus 114 that couples elements 104-112 to the processing unit 102.

The bus 114 may comprise any type of bus architecture. Examples include a memory bus, a peripheral bus, a local bus, etc. The processing unit 102 is an instruction execution machine, apparatus, or device and may comprise a microprocessor, a digital signal processor, a graphics processing unit, an application specific integrated circuit (ASIC), a field programmable gate array (FPGA), etc. The processing unit 102 may be configured to execute program instructions stored in memory 104 and/or storage 106 and/or received via data entry module 108.

The memory 104 may include read only memory (ROM) 116 and random access memory (RAM) 118. Memory 104 may be configured to store program instructions and data during operation of device 100. In various embodiments, memory 104 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 104 may also include nonvolatile memory technologies such as nonvolatile flash RAM (NVRAM) or ROM. In some embodiments, it is contemplated that memory 104 may include a combination of technologies such as the foregoing, as well as other technologies not specifically mentioned. When the subject matter is implemented in a computer system, a basic input/output system (BIOS) 120, containing the basic routines that help to transfer information between elements within the computer system, such as during start-up, is stored in ROM 116.

The storage 106 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 100.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 106, ROM 116 or RAM 118, including an operating system 122, one or more applications programs 124, program data 126, and other program modules 128. A user may enter commands and information into the hardware device 100 through data entry module 108. Data entry module 108 may include mechanisms such as a keyboard, a touch screen, a pointing device, etc. Other external input devices (not shown) are connected to the hardware device 100 via external data entry interface 130. By way of example and not limitation, external input devices may include a microphone, joystick, game pad, satellite dish, scanner, or the like. In some embodiments, external input devices may include video or audio input devices such as a video camera, a still camera, etc. Data entry module 108 may be configured to receive input from one or more users of device 100 and to deliver such input to processing unit 102 and/or memory 104 via bus 114.

A display 132 is also connected to the bus 114 via display adapter 110. Display 132 may be configured to display output of device 100 to one or more users. In some embodiments, a given device such as a touch screen, for example, may function as both data entry module 108 and display 132. External display devices may also be connected to the bus 114 via external display interface 134. Other peripheral output devices, not shown, such as speakers and printers, may be connected to the hardware device 100.

The hardware device 100 may operate in a networked environment using logical connections to one or more remote nodes (not shown) via communication interface 112. The remote node may be another computer, a server, a router, a peer device or other common network node, and typically includes many or all of the elements described above relative to the hardware device 100. The communication interface 112 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 112 may include logic configured to support direct memory access (DMA) transfers between memory 104 and other devices.

In a networked environment, program modules depicted relative to the hardware device 100, or portions thereof, may be stored in a remote storage device, such as, for example, on a server. It will be appreciated that other hardware and/or software to establish a communications link between the hardware device 100 and other devices may be used.

It should be understood that the arrangement of hardware device 100 illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of hardware device 100.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1.

Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operations described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context. In an embodiment, the computer system 100 includes one or more methods for block-based backups for sub-file modifications.

In the prior art, tracking sub-file modifications to existing files may become a significant problem if a file system consists of several large (possibly sparse) files that are being randomly written to by an application. Embodiments herein enable block-based backups for sub-file modifications. A blocking enhancer tracks sub-file modifications to large files such that it is extremely easy, fast, and efficient to eliminate duplicate sub-file modifications, track and store the sub-file modifications and read them during backup.

Figure 2:
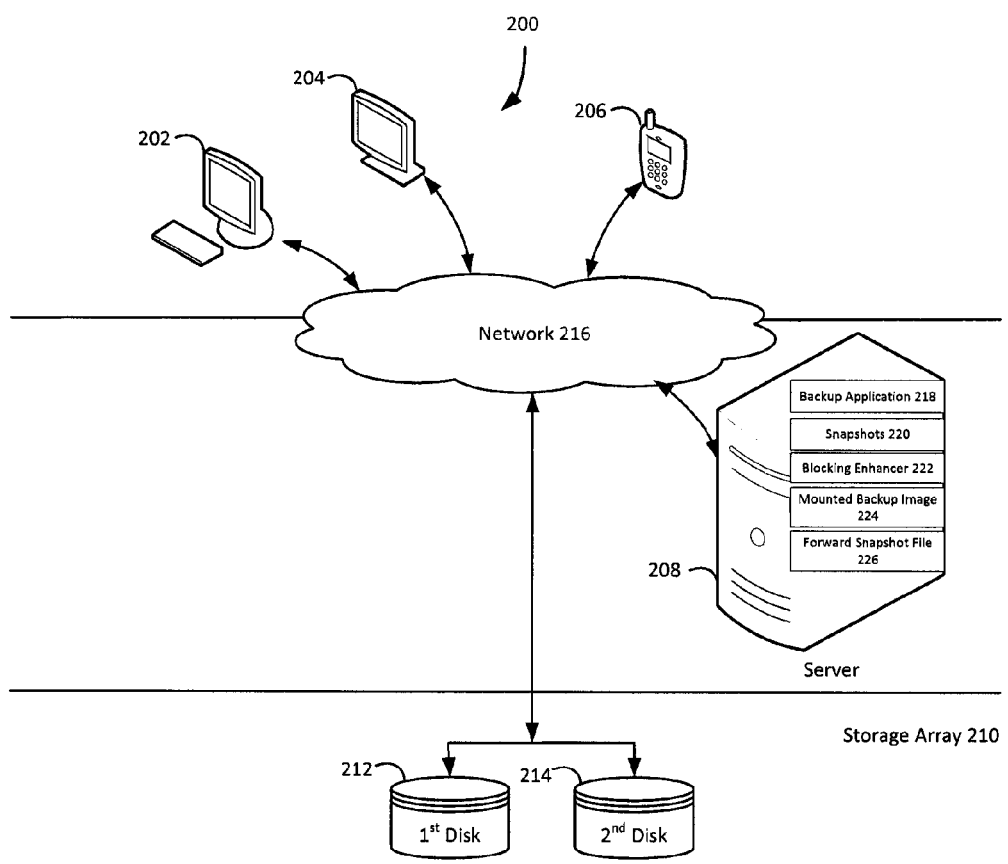
FIG. 2 illustrates a block diagram of an example system for block-based backups for sub-file modifications, under an embodiment.

FIG. 2 illustrates a block diagram of a system that implements block-based backups for sub-file modifications, under an embodiment. As shown in FIG. 2, system 200 may illustrate a cloud computing environment in which data, applications, services, and other resources are stored and delivered through shared data-centers and appear as a single point of access for the users. The system 200 may also represent any other type of distributed computer network environment in which servers control the storage and distribution of resources and services for different client users.

In an embodiment, the system 200 represents a cloud computing system that includes a first client 202, a second client 204, and a third client 206; and a server 208 and a storage array 210 that may be provided by a hosting company. The storage array 210 includes a first disk 212 and a second disk 214. The clients 202-206, the server 208, and the storage array 210 communicate via a network 216. Although FIG. 2 depicts the system 200 with three clients 202-206, one server 208, one storage array 210, two disks 212-214, and one network 216, the system 200 may include any number of clients 202-206, servers 208, storage arrays 210, disks 212-214, and networks 216. The clients 202-206 and the server 208 may each be substantially similar to the system 100 depicted in FIG. 1.

The server 208 includes a backup application 218, snapshots 220, a blocking enhancer 222, a file modification journal 224, an optional mounted backup image 226, and an optional forward snapshot file 228. The backup application 218 creates the snapshots 220 of data objects for the clients 202-206 and/or the server 208, and stores the snapshots 220 on the server 208. The system 200 enables the backup application 218 to execute a rollback based on snapshots 220. FIG. 2 depicts the system elements 218-228 residing completely on the server 208, but the system elements 218-228 may reside completely on the server 204, completely on the clients 202-206, completely on another server that is not depicted in FIG. 2, or in any combination of partially on the server 208, partially on the clients 202-206, and partially on the other server.

The backup application 218 may be, for example, EMC Corporation's NetWorker® backup application, which is a suite of enterprise level data protection software that unifies and automates backup to tape, disk-based, and flash-based storage media across physical and virtual environments for granular and disaster recovery. Cross-platform support is provided for many environments, including Microsoft Windows®. A central NetWorker® server manages a data zone that contains backup clients and NetWorker® storage nodes that access the backup media. The NetWorker® management console software provides a graphic user interface for functions such as client configuration, policy settings, schedules, monitoring, reports, and daily operations for deduplicated and non-deduplicated backups. The core NetWorker® software backs up client file systems and operating system environments. Add-on database and application modules provide backup services for products such as Microsoft® Exchange Server. Client backup data can be sent to a remote NetWorker® storage node or stored on a locally attached device by the use of a dedicated storage node. EMC Corporation's NetWorker® modules for Microsoft® applications supports Microsoft® products such as Microsoft® Exchange, Microsoft® Sharepoint, Microsoft® SQL Server, and Microsoft® Hyper-V servers. Although the functionality examples described in this paragraph apply to EMC Corporation's NetWorker® backup application, one of skill in the art would recognize that other backup applications and their corresponding functionalities may be used.

The blocking enhancer 222 may create a snapshot of the file system to be backed if an application consistent backup is specified by a system user. However, the blocking enhancer 222 may also create a backup without creating a snapshot of the file system.

The blocking enhancer 222 records an identifier of a modified file into a file modification journal 224. For example, the blocking enhancer 222 records the file identifier A into the file modification journal 224 because the File A includes a sub-file modification that occurred since the last backup. This example illustrates how the file modification journal 224 remains limited in size because the file modification journal 224 does not track any of the many possible ranges where sub-file modifications occurred within the File A. The file modification journal 224 includes a list of all modified files, such as file creates, removes, renames, and modifications, The blocking enhancer 222 tracks all files that are modified, created, removed, renamed, etc. If a file is created, removed, renamed, or modified, the blocking enhancer 222 makes an entry in the file modification journal 224 to reflect the activity. The file modification journal 224 keeps one entry for each modified file indexed on the file identifier (or Mode number) such that the file modification journal 224 reflects all of modifications to any file in one record. The file modification journal 224 does not track the exact sub-file ranges of a file that is modified, as the file modification journal 224 tracks only the file identifier for files that are modified. Therefore, the file modification journal 224 does not grow unbounded with time and can represent a summary of all modifications to a file in a single record. This size limitation makes the backup process faster because the backup process does not need to read multiple file change records from multiple places in the file modification journal 224 to identify various modifications to a file.

The blocking enhancer 222 may create a backup copy of a modified file if the modified file is a newly created file. For example, the blocking enhancer 222 creates a copy of the newly created File B because the entire file is read to back it up for newly created files.

The blocking enhancer 222 may delete a backup copy of a modified file if the modified file is a deleted file. For example, the blocking enhancer 222 deletes the backup copy of the File C in response to the File C being deleted in the file system because the entire file is deleted from the backup image for deleted files.

The blocking enhancer 222 may rename a backup copy of a modified file if the modified file is a renamed file. For example, the blocking enhancer 222 renames the backup copy of the File D in response to the File D being renamed in the file system because the file in the backup image is renamed to reflect its new path for renamed files.

The blocking enhancer 222 may delete a modified file from a file modification journal 224 if the modified file is a newly created file, a deleted file, a renamed file, or a user-specified file type. For example, in addition to deleting the File B, the File C, and the File D from the file modification journal 224, the blocking enhancer 222 also deletes the File E because the File E is a video file and a system user specified to delete video files from the file modification journal 224. Since the blocking enhancer 222 can choose to ignore any of the files recorded as modified in the file modification journal 224, the backup process is selective. Therefore, the blocking enhancer 222 obtains a block map of the file from the file system only for files that include sub-file modifications. The file modification journal 224 identifies the newly create, deleted, and renamed files that do not include sub-file modifications, such the blocking enhancer 222 processes these identified files more efficiently, without having to obtains a block map of these files from the file system because these files do not include sub-file modifications.

The blocking enhancer 222 records an identifier corresponding to a modified block in a file system into a modified block map. For example, the blocking enhancer 222 records the block identifier 1102 that corresponds to a block modified since the last backup, and stores the block identifier 1102 into a modified block map. This example illustrates how the regions of sub-file modifications are tracked more efficiently using existing block boundaries. The blocking enhancer 222 facilitates the next incremental backup by tracking all of the modified blocks of the file system using a modified block tracking driver, and storing identifiers of the modified blocks in a modified block map. The modified block tracking driver functions at the block level to track which blocks of a file system are modified by dividing the block storage into small ranges and keeping a bitmap such that one bit is assigned to one range of the block device. If any range of the file system is modified (in part on in full), the modified block tracking driver sets the corresponding bit for that range in the bitmap. The modified block tracking driver stores the bitmap persistently on a disk, and can concisely and efficiently track all modified blocks. Therefore, tracking file modifications at the block level is extremely fast, efficient, and compact in space.

The blocking enhancer 222 creates a modified file block map based on an identifier of a modified file in a file modification journal 224. For example, the blocking enhancer 222 creates a modified file block map based on the modified File A, which corresponds to the block identifiers 1101 and 1102. At the time of next incremental backup, the blocking enhancer 222 obtains a list of the modified files that include sub-file modifications from the file modification journal 224, and obtains a block map of these modified files. The blocking enhancer 222 may obtain the modified file block map by querying the file system for the block map of each file. The blocking enhancer 222 may create the modified file block map by using an application program interface associated with the file system to query the file system based on the identifier of the modified file in the file modification journal 224. For example, file systems such as new technology file system (NTFS) and resilient file system (ReFS) expose an application program interface to obtain the block map of a file. The modified file block map may include a mapping of a logical offset corresponding to the modified file to a corresponding physical location of a corresponding block that contains data corresponding to the logical offset.

The blocking enhancer 222 identifies a modified file block corresponding to the modified file based on an intersection of the modified block map and the modified file block map. For example, the blocking enhancer 222 intersects the modified block map, which includes the block identifier 1102, and the modified file block map, which includes the block identifiers 1101 and 1102 corresponding to modified File A, to identify the block identifier 1102 corresponding to the modified File A. The intersection provides a list of modified blocks corresponding to the modified files. The blocking enhancer 222 may identify a logical offset and a length of consecutive modified blocks corresponding to the modified file.

The blocking enhancer 222 reads the modified file block from the file system using a file system read interface. For example, the blocking enhancer 222 uses a file system read( ) interface to read the modified block 1102 corresponding to the modified File A. The blocking enhancer 222 reads only the modified blocks of the modified files that include sub-file modifications because the intersection of the maps also identifies unmodified blocks of the modified files, which do not need to be read.

The blocking enhancer 222 writes a modified file block to a backup storage. For example, the blocking enhancer 222 writes the modified block 1102 corresponding to the modified sparse File A to a backup storage to create an incremental backup of a sub-file modification for the modified sparse File A. The modified file blocks that are read for the sub-files modifications are stored in the backup storage or data-domain box, such that the file can be synthesized from its previous backup image and the incremental backups. In another example, the blocking enhancer 222 writes the modified block 1102 corresponding to the modified sparse File A to the previous backup in the backup storage at the same offset, which modifies the previous backup to include the incremental backup of the sub-file modification for the modified sparse File A.

As an alternative to writing only the modified file blocks to create backups of the modified blocks for sparse files, the blocking enhancer 222 may write the modified file blocks to create incremental backups of the modified files for non-sparse tiles. To do so, the blocking enhancer 222 may create the mounted backup image 226 by mounting a previously created block-based backup of the file system onto a proxy host. For example, the blocking enhancer 222 mounts the previously created block-based backup of the file system onto the server 208 to create the mounted backup image 226.

The blocking enhancer 222 may enable a forward snapshot of the mounted backup image 226. For example, the blocking enhancer 222 enables a forward snapshot of the mounted backup image 226. Enabling a forward snapshot for the mounted backup image 226 results in all of the modified blocks written to the mounted backup image 226 to be merged together with related unmodified blocks stored in the mounted backup image 226 and written together in a new file called the forward snapshot file 228.

The blocking enhancer 222 may create the forward snapshot file 228 for the modified file by writing the modified file block to the mounted backup image 226 using a file system write interface. For example, the blocking enhancer 222 uses a file system write( ) interface to write the modified block 1102 corresponding to the modified File A to the mounted backup image 226 at the same offset, and the forward snapshot function merges the unmodified block 1101 from the mounted backup image 226 with the modified block 1102, along with the metadata for the modified File A to create a complete forward snapshot file 228 for the modified File A. This results in the entire modified files being incrementally backed up. The forward snapshot file 228 includes a modification corresponding to the modified file. For example, the forward snapshot file 228 includes the modifications required to update the modified file A. One of skill in the art will recognize that the forward snapshot file 228 may include the modifications required to selectively update multiple modified files. The blocking enhancer 222 may convert the forward snapshot file 228 to a block-based backup. For example, the blocking enhancer 222 converts the forward snapshot file 228 into a block backed backup format if the forward snapshot file 228 is not already in a block backed backup format.

Figure 3:
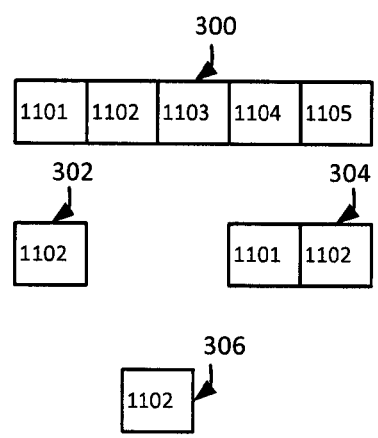
FIG. 3 is a screen shot illustrating extremely simplified example data for block-based backups for sub-file modifications, under an embodiment.

FIG. 3 illustrates extremely simplified example data for block-based backups for sub-file modifications, under an embodiment. The data includes blocks 300 in a file system, a modified block map 302, a modified file block map 304, and a modified file block 306. The blocks 300 indicate that the file system includes the blocks numbered 1101, 1102, 1103, 1104, and 1105. The modified block map 302 indicates that a modified block tracking driver identified that the block 1102 was modified after the most recent backup of the file system. The modified file block map 304 indicates that the File A, which was modified after the most recent backup of the file system, includes the blocks 1101 and 1102. The modified file block 306 indicates the intersection of the modified block map 302 and the modified file block map 304 is the block 1102. Even though the modified File A includes both the block 1101 and the block 1102, the block 1101 is not in the intersection because the modified block map 302 indicates that the block 1101 was not modified after the most recent backup of the file system. Therefore, the blocking enhancer 222 does not have to read the block 1101 when creating a backup of the file system. The blocking enhancer 222 may write the block 1102 to the backup storage to create an incremental backup for the modified File A, may write the block 1102 to the previous backup in the backup storage at the same offset to modify the previous backup of the File A to include the sub-file modification to the modified File A, or may use the forward snapshot function enabled for the mounted backup image 226 with the previously created block 1101 to create the forward snapshot file 228. Although saving the time and resources by not reading the unmodified block 1101 in the file system may seem relatively insignificant in this extremely simplified example, when hundreds of files have been modified, and each of these files includes numerous unmodified blocks, the time and resources saved may be substantial, particularly for sparse files.

Figure 4:
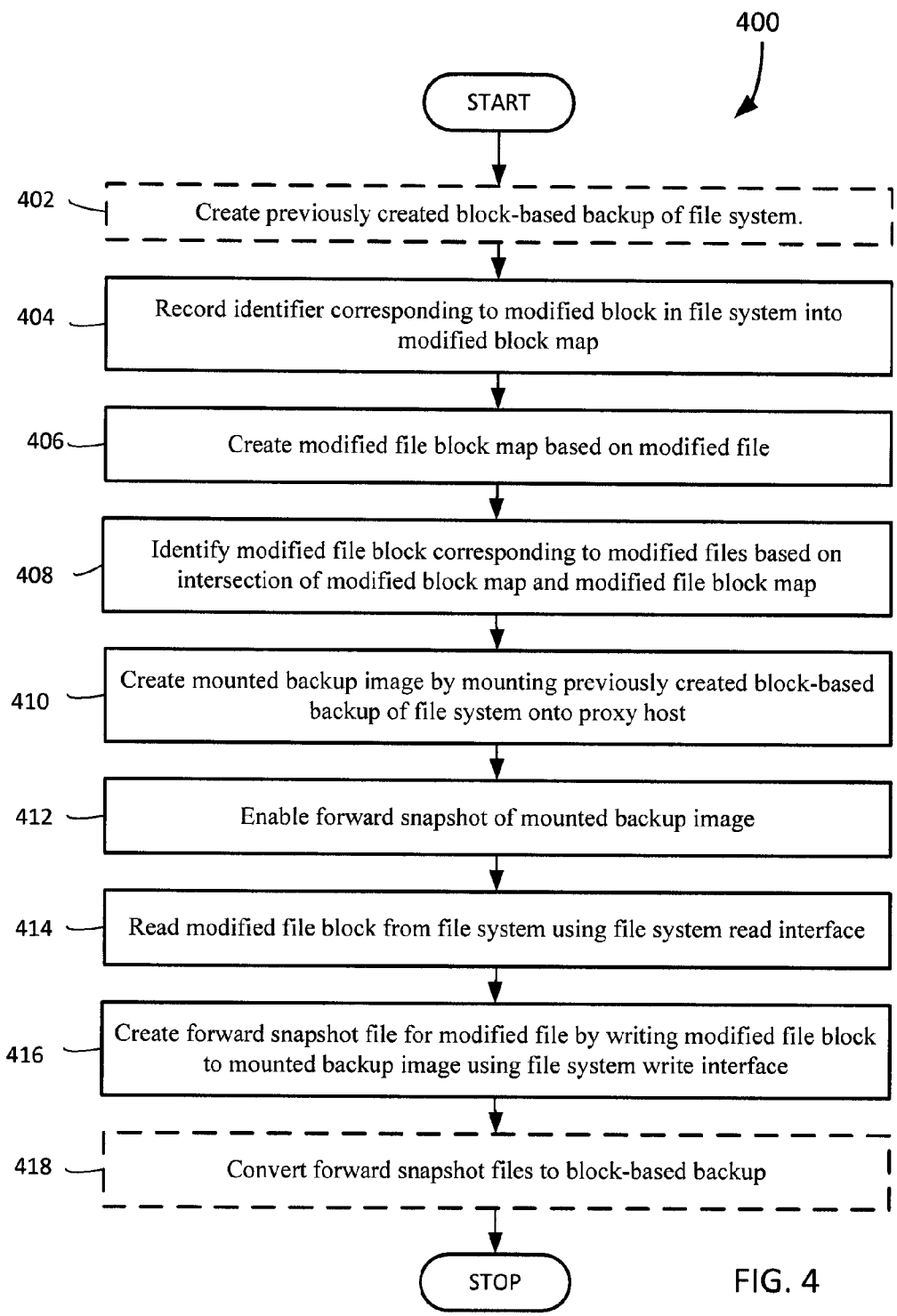
FIG. 4 is a flowchart that illustrates a method of block-based backups for sub-file modifications, under an embodiment.

FIG. 4 is a flowchart that illustrates a method for block-based backups for sub-file modifications, under an embodiment. Flowchart 400 illustrates method acts illustrated as flowchart blocks for certain steps involved in and/or between the clients 202-206 and/or the server 208 of FIG. 2.

An identifier of a modified file is recorded into a file modification journal, block 402. For example, the blocking enhancer 422 records the file identifier A into the file modification journal 224 because the File A includes a sub-file modification that occurred since the last backup.

A backup copy of a modified file is optionally created if the modified file is a newly created file, block 404. For example, the blocking enhancer 222 creates a copy of the newly created File B.

A backup copy of a modified file is optionally deleted if the modified file is a deleted file, block 406. For example, the blocking enhancer 222 deletes the backup copy of the File C because the File C is deleted in the file system.

A backup copy of a modified file is optionally renamed if the modified file is a renamed file, block 408. For example, the blocking enhancer 222 renames the backup copy of the File D because the File D is renamed in the file system.

A modified file is optionally deleted from a file modification journal if the modified file is a newly created file, a deleted file, a renamed file, or a user-specified file type, block 410. For example, in addition to deleting the File B, the File C, and the File D from the file modification journal 224, the blocking enhancer 222 also deletes the File E because the File E is a video file and a system user specified to delete video files from the file modification journal 224.

An identifier corresponding to a modified block in a file system is recorded into a modified block map, block 412. For example, the blocking enhancer 222 records the block identifier 1102 that corresponds to a block modified since the last backup, and stores the block identifier 1102 into the modified block map 302.

A modified file block map is created based on an identifier of a modified file in a file modification journal, block 414. For example, the blocking enhancer 222 creates the modified file block map 304 based on the modified File A, which corresponds to the block identifiers 1101 and 1102.

A modified file block corresponding to a modified file is identified based on an intersection of a modified block map and a modified file block map, block 416. For example, the blocking enhancer 222 intersects the modified block map 302, which includes the block identifier 1102, and the modified file block map 304, which includes the block identifiers 1101 and 1102 corresponding to modified File A, to identify the block identifier 1102 corresponding to the modified File A.

A modified file block is read from a file system using a file system read interface, block 418. For example, the blocking enhancer 222 uses a file system read( ) interface to read the modified block 1102 corresponding to the modified File A.

A modified file block is written to a backup storage, block 420. For example, the blocking enhancer 222 writes the modified block 1102 corresponding to the modified sparse File A to a backup storage to create an incremental backup of a sub-file modification for the modified File A.

Although FIG. 4 depicts the blocks 402-420 occurring in a specific order, the blocks 402-420 may occur in another order. In other implementations, each of the blocks 402-420 may also be executed in combination with other blocks and/or some blocks may be divided into a different set of blocks.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system for block-based backups for sub-file modifications, the system comprising:
a processor-based application executed on a computer and configured to:
record an identifier of a modified file into a file modification journal;
record an identifier corresponding to a modified block in a file system into a modified block map;
create a modified file block map based on the identifier of the modified file in the file modification journal;
identify a modified file block corresponding to the modified file based on an intersection of the modified block map and the modified file block map;
read the modified file block from the file system using a file system read interface; and
write the modified file block to a backup storage.

2. The system of claim 1, wherein the processor-based application is further configured to:
create a backup copy of the modified file if the modified file is a newly created file;
delete the backup copy of the modified file if the modified file is a deleted file;
rename the backup copy of the modified file if the modified file is a renamed file; and
delete the modified file from the file modification journal if the modified file is one of the newly created file, the deleted file, and the renamed file.

3. The system of claim 1, wherein the processor-based application is further configured to delete the modified file from the file modification journal if the modified file is a user-specified file type.

4. The system of claim 1, wherein creating the modified file block map comprises using an application program interface associated with the file system to query the file system based on the modified file.

5. The system of claim 1, wherein the modified file block map comprises a mapping of a logical offset corresponding to the modified file to a corresponding physical location of a corresponding block that contains data corresponding to the logical offset.

6. The system of claim 1, wherein identifying the modified file block comprises identifying a logical offset and a length of consecutive modified blocks corresponding to the modified file.

7. The system of claim 1, wherein writing the modified file block to the backup storage comprises:
creating a mounted backup image by mounting a previously created block-based backup of the file system onto a proxy host;
enabling a forward snapshot of the mounted backup image; and
creating a forward snapshot file for the modified file by writing the modified file block to the mounted backup image using a file system write interface.

8. A computer-implemented method for block-based backups for sub-file modifications, the method comprising:
recording an identifier of a modified file into a file modification journal;
recording an identifier corresponding to a modified block in a file system into a modified block map;
creating a modified file block map based on the identifier of the modified file in the file modification journal;
identifying a modified file block corresponding to the modified file based on an intersection of the modified block map and the modified file block map;
reading the modified file block from the file system using a file system read interface; and
writing the modified file block to a backup storage.

9. The method of claim 8, wherein the method further comprises:
creating a backup copy of the modified file if the modified file is a newly created file;
deleting the backup copy of the modified file if the modified file is a deleted file;
renaming the backup copy of the modified file if the modified file is a renamed file; and
deleting the modified file from the file modification journal if the modified file is one of the newly created file, the deleted file, the renamed file, and a user-specified file type.

10. The method of claim 8, wherein creating the modified file block map comprises using an application program interface associated with the file system to query the file system based on the modified file.

11. The method of claim 8, wherein the modified file block map comprises a mapping of a logical offset corresponding to the modified file to a corresponding physical location of a corresponding block that contains data corresponding to the logical offset.

12. The method of claim 8, wherein identifying the modified file block comprises identifying a logical offset and a length of consecutive modified blocks corresponding to the modified file.

13. The method of claim 8, wherein writing the modified file block to the backup storage comprises:
creating a mounted backup image by mounting a previously created block-based backup of the file system onto a proxy host;

enabling a forward snapshot of the mounted backup image; and creating a forward snapshot file for the modified file by writing the modified file block to the mounted backup image using a file system write interface.

14. A computer program product, comprising a non-transitory computer-readable medium having a computer-readable program code embodied therein to be executed by one or more processors, the program code including instructions to:

record an identifier of a modified file into a file modification journal;

record an identifier corresponding to a modified block in a file system into a modified block map;

create a modified file block map based on the identifier of the modified file in the file modification journal;

identify a modified file block corresponding to the modified file based on an intersection of the modified block map and the modified file block map;

read the modified file block from the file system using a file system read interface; and write the modified file block to a backup storage.

15. The computer program product of claim 14, wherein the program code includes further instructions to:

create a backup copy of the modified file if the modified file is a newly created file;

delete the backup copy of the modified file if the modified file is a deleted file;

rename the backup copy of the modified file if the modified file is a renamed file; and delete the modified file from the file modification journal if the modified file is one of the newly created file, the deleted file, and the renamed file.

16. The computer program product of claim 14, wherein the program code includes further instructions to delete the modified file from the file modification journal if the modified file is a user-specified file type.

17. The computer program product of claim 14, wherein creating the modified file block map comprises using an application program interface associated with the file system to query the file system based on the modified file.

18. The computer program product of claim 14, wherein the modified file block map comprises a mapping of a logical offset corresponding to the modified file to a corresponding physical location of a corresponding block that contains data corresponding to the logical offset.

19. The computer program product of claim 14, wherein identifying the modified file block comprises identifying a logical offset and a length of consecutive modified blocks corresponding to the modified file.

20. The computer program product of claim 14, wherein writing the modified file block to the backup storage comprises:

creating a mounted backup image by mounting a previously created block-based backup of the file system onto a proxy host;

enabling a forward snapshot of the mounted backup image; and creating a forward snapshot file for the modified file by writing the modified file block to the mounted backup image using a file system write interface.

* * * * *